(12) United States Patent
Fensore

(10) Patent No.: US 7,035,983 B1
(45) Date of Patent: Apr. 25, 2006

(54) SYSTEM AND METHOD FOR FACILITATING COMMUNICATION ACROSS AN ASYNCHRONOUS CLOCK BOUNDARY

(75) Inventor: David J Fensore, New Gloucester, ME (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 382 days.

(21) Appl. No.: 10/423,993

(22) Filed: Apr. 25, 2003

(51) Int. Cl.
*G06F 12/00* (2006.01)

(52) U.S. Cl. .......................... 711/156; 711/154; 710/56; 710/57

(58) Field of Classification Search ................. 711/154, 711/156; 710/56, 57; 326/40; 365/189.07, 365/221, 223
See application file for complete search history.

(56) References Cited

U.S. PATENT DOCUMENTS

| | | | |
|---|---|---|---|
| 6,226,698 B1 | 5/2001 | Yeung et al. | |
| 6,249,798 B1 * | 6/2001 | Golliver et al. | 708/490 |
| 6,327,207 B1 | 12/2001 | Sluiter et al. | |
| 6,366,530 B1 * | 4/2002 | Sluiter et al. | 365/240 |
| 6,493,818 B1 * | 12/2002 | Robertson | 712/27 |
| 6,590,826 B1 * | 7/2003 | Sawyer | 365/230.03 |
| 6,850,092 B1 * | 2/2005 | Chelcea et al. | 326/93 |
| 6,862,673 B1 * | 3/2005 | Lee et al. | 711/169 |
| 6,880,050 B1 * | 4/2005 | Korger | 711/156 |

* cited by examiner

*Primary Examiner*—B. James Peikari
*Assistant Examiner*—Woo H. Choi

(57) ABSTRACT

A method includes storing data in one of a plurality of memory slots in a queue. Each memory slot is associated with a plurality of flags. The method also includes toggling a first of the flags associated with the slot. The method further includes retrieving the data from the memory slot. In addition, the method includes toggling a second of the flags associated with the slot.

14 Claims, 3 Drawing Sheets

SYSTEM AND METHOD FOR FACILITATING COMMUNICATION ACROSS AN ASYNCHRONOUS CLOCK BOUNDARY

TECHNICAL FIELD

This disclosure is generally directed to computer systems and more specifically to a system and method for facilitating communication across an asynchronous clock boundary.

BACKGROUND

Computing and other systems often use multiple clock signals to perform various functions. For example, different buses may transport data between components of a computer system. These buses often operate at different speeds and use different clock signals. In these systems, components that use a common clock signal may form a "clock domain." A queue is typically used to facilitate communication across the boundary between two clock domains. For example, data from one clock domain may be written into the queue, and the data is read from the queue by another clock domain.

A problem with conventional computer systems is that the size of the queue is often difficult to manage. As an example, some synchronization techniques require that the number of entries in some queues equals a power of two ($2^N$). Because of this, it is often difficult to increase the size of the queue without wasting space. As a particular example, if the size of a queue needs to be increased by twenty percent, the number of entries in the queue would typically be doubled, resulting in much wasted space. Other techniques use a ring counter to manage a queue, but this makes it difficult to test the fullness of the queue and to determine if an arbitrary location in the queue is occupied.

SUMMARY

This disclosure provides a system and method for facilitating communication across an asynchronous clock boundary.

In one embodiment, a method includes storing data in one of a plurality of memory slots in a queue. Each memory slot is associated with a plurality of flags. The method also includes toggling a first of the flags associated with the slot. The method further includes retrieving the data from the memory slot. In addition, the method includes toggling a second of the flags associated with the slot.

In another embodiment, a system includes a memory comprising a plurality of memory slots and a plurality of flags associated with each of the memory slots. The system also includes at least one controller operable to at least one of store data in the memory slots and retrieve data from the memory slots based at least partially on the flags associated with the memory slots.

In yet another embodiment, a processor includes an integer unit operable to execute integer instructions and a floating point unit operable to execute floating point instructions. The processor also includes a memory comprising a plurality of memory slots and a plurality of flags associated with each of the memory slots. In addition, the processor includes at least one controller that is operable to at least one of (1) store data in one of the memory slots and toggle a first of the flags associated with that memory slot, and (2) retrieve data from one of the memory slots and toggle a second of the flags associated with that memory slot.

One or more technical features may be present according to various embodiments of this disclosure. Particular embodiments of this disclosure may exhibit none, some, or all of the following features depending on the implementation. For example, in one embodiment, a system for facilitating communication across an asynchronous clock boundary is provided. In particular, the system includes a queue that can be used to transfer information across a boundary between two clock domains.

At least two flags are associated with each memory slot is in the queue where data may be stored and retrieved. When data is written to a memory slot in the queue by one clock domain, a first flag is toggled. When that data is read from the memory slot by another clock domain, a second flag is toggled. Each clock domain can determine whether valid data is present in a particular memory slot by comparing the flags. In one embodiment, if the flags are equal, the memory slot is free and can be used to store data. If the flags are unequal, the memory slot contains valid data that has not been transferred across the boundary. In this way, information can easily be transferred between clock domains, which may simplify the logic needed in the queue. Also, the queue could have any suitable size and may, but need not, have a size equal to a power of two. In addition, this may make it easier to test the fullness of the queue and to determine if an arbitrary location in the queue is occupied.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
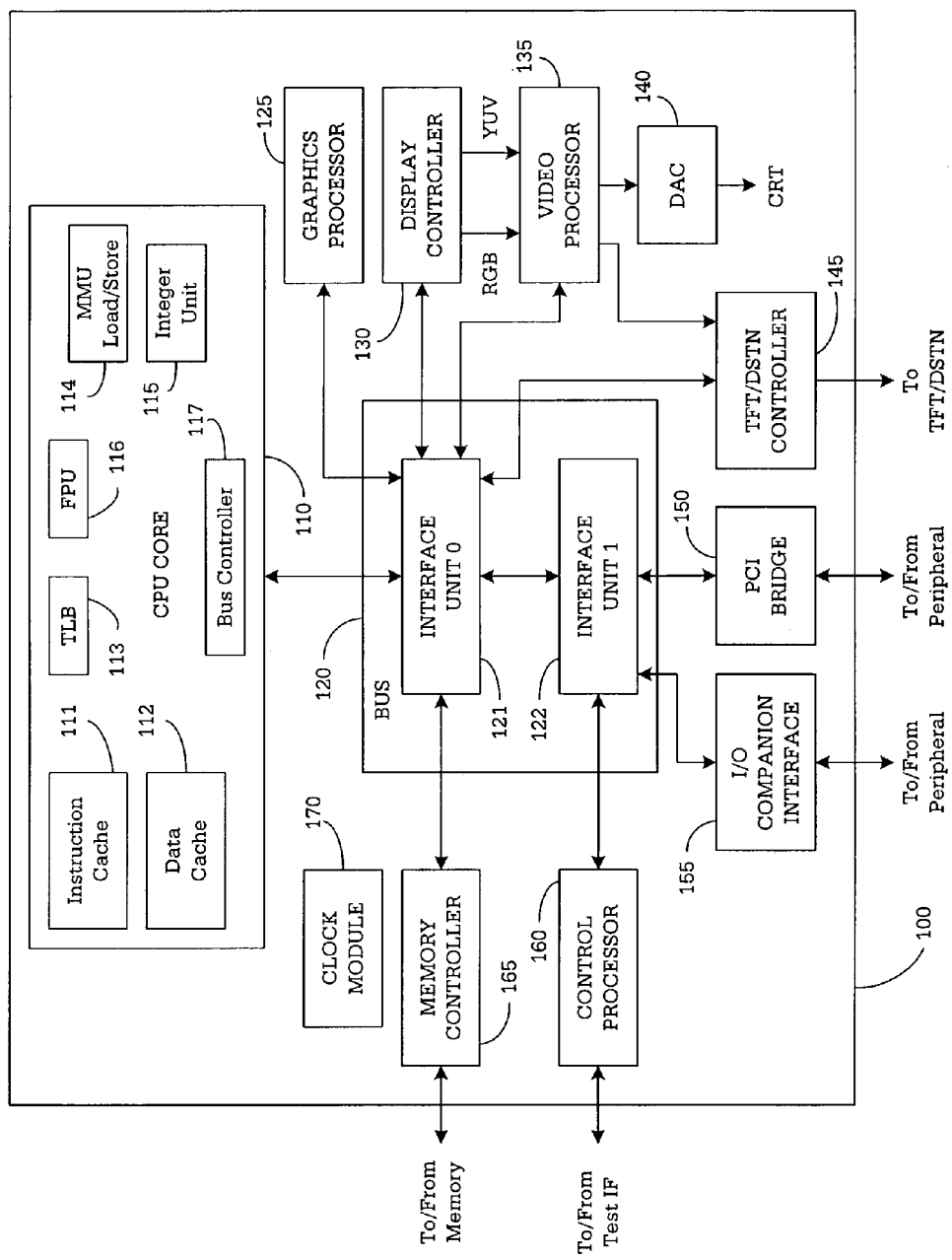
FIG. 1 is a block diagram of an example processing system according to one embodiment of this disclosure.

FIG. 1 is a block diagram of an example processing system 100 according to one embodiment of this disclosure. The processing system 100 illustrated in FIG. 1 is for illustration only. Other processing systems could be used without departing from the scope of this disclosure.

In one aspect of operation, the processing system 100 includes components operating in two or more clock domains. For example, a peripheral component interconnect (PCI) bridge 150 may facilitate communication between an internal bus 120 of the processing system 100 and an external PCI bus, where the buses operate at different speeds. To facilitate communication between these buses, the PCI bridge 150 could include one or more queues. Each queue allows one of the clock domains to store data and another of the clock domains to retrieve the data. The clock domains need not be synchronized in order to communicate. Also, simpler logic can be used to control the queue, and the queue could have any suitable size.

In the illustrated example, the processing system 100 includes a central processing unit (CPU) core 110. The CPU core 110 executes instructions, such as integer instructions and floating point instructions. For example, the CPU core 110 could execute instructions contained in an application executed by a host computer. In one embodiment, the processing system 100 represents an x86 compatible device. In a particular embodiment, the CPU core 110 executes instructions in a combination of instruction sets, such as the Intel Pentium, Intel Pentium Pro, AMD K6 3DNow!, AMD K7 3DNow!, AMD K7 MMX, and National Semiconductor GX1 instruction sets.

In this example, the CPU core 110 includes an instruction cache 111, a data cache 112, a translation look-aside buffer (TLB) 113, a memory management unit (MMU) load/store block 114, an integer unit 115, a floating point unit (FPU) 116, and a bus controller 117. The instruction cache 111 and the data cache 112 represent memories used to store and facilitate retrieval of information used by the CPU core 110. For example, the instruction cache 111 could store instructions that have been, are, or may be executed by the integer unit 115 or the FPU 116. The data cache 112 could store data being processed by the integer unit 115 or the FPU 116, such as operands in an arithmetic operation. The caches 111, 112 could represent any suitable memory device or combination of devices. In one embodiment, each cache 111, 112 represents sixteen kilobytes of memory space. In a particular embodiment, each cache 111, 112 represents a single-clock access, sixteen kilobyte, four-way set associative cache. While FIG. 1 illustrates two separate caches 111, 112, the caches 111, 112 could be combined into a single memory or further subdivided into additional memories. Also, the caches 111, 112 could store any other or additional information.

The TLB 113 and MMU 114 support the use of virtual memory addresses by the processing system 100. For example, the processing system 100 may allow applications and an operating system to use virtual addresses to store and retrieve instructions and data. When the application or operating system is executed, the MMU 114 may receive the virtual memory address and access the TLB 113. The TLB 113 includes a table identifying various virtual addresses and the physical addresses corresponding to those virtual addresses. Using the TLB 113, the MMU 114 converts the received virtual address into a physical memory address. The processing system 100 may then use the physical memory address to access a memory.

The integer unit 115 executes integer instructions. In one embodiment, the integer unit 115 includes a single-issue, eight-stage pipeline. In a particular embodiment, the integer pipeline includes an instruction prefetch stage, an instruction predecode stage, an instruction decode stage, an instruction queue stage, two address calculation stages, an execution stage, and a writeback stage.

In the instruction prefetch stage, raw instructions are fetched from the instruction cache 111. The instruction predecode stage extracts prefix bytes from the raw instruction bits. The predecode operation also looks-ahead to the next instruction and a potential bubble can be eliminated if the pipeline stalls downstream. The instruction decode stage performs a full decode of the instruction data and indicates the instruction length back to the prefetch stage, allowing the prefetch stage to shift the appropriate number of bytes to the beginning of the next instruction.

The instruction queue stage comprises a first in-first out (FIFO) queue containing decoded x86 instructions. The instruction queue allows the instruction decode stage to proceed even if the pipeline is stalled downstream. Register read operations for data operand address calculations are performed in the instruction queue stage. The first address calculation stage computes the linear address of operand data (if required) and issues requests to data cache 112. Microcode can take over the pipeline and inject a micro-box if multi-box instructions require additional data operands. In the second address calculation stage, operand data (if required) is returned and set up to the execution unit stage with no bubbles if there was a data cache hit. Segment limit checking also is performed on the data operand address. The micro-read-only-memory (μROM) is read for setup to the execution unit stage.

In the execution unit stage, register and/or data memory fetches are fed through an arithmetic logic unit (ALU) for arithmetic or logical operations. The μROM may fire for the first instruction box into the pipeline. Microcode may control the pipeline and insert additional boxes in the execution unit stage if the instruction requires multiple execution unit stages to complete. The writeback stage writes results of the execution unit stage to the register file or to data memory.

The FPU 116 executes floating point instructions. In one embodiment, the FPU 116 includes multiple pipelines, such as an execution pipeline and a load/store pipeline. Also, the FPU 116 can execute instructions in one or more instruction sets, such as the x87, MMX, and 3DNow! instruction sets. The FPU 116 could also support dynamic scheduling of instructions, which may help to reduce stalls in the pipelines of the FPU 116. The FPU 116 could further support out-of-order execution and register renaming. In addition, the FPU 116 could perform floating point operations in accordance with the IEEE 754 standard and support an instruction issue rate of one instruction per clock from the integer core. In a particular embodiment, the FPU 116 could have a data path that is optimized for single precision arithmetic, while extended precision arithmetic is handled by microcode and multiple passes through the pipelines of the FPU 116.

The bus controller 117 facilitates communication between the CPU core 110 and other components of the processing system 100. For example, when needed data is not available in the caches 111, 112, the bus controller 117 could support the transfer of the data from the external memory to the CPU core 110 over an internal bus 120.

The internal bus 120 facilitates communication between various components of the processing system 100. In this example, the bus 120 includes a first interface unit 121 and a second interface unit 122. The first interface unit 121 facilitates communication between higher-speed components of the processing system 100, while the second interface unit 122 facilitates communication between lower-speed components of the processing system 100. The interface units 121, 122 may also communicate with each other so that the higher-speed components and the lower-speed components may communicate. While FIG. 1 may illustrate a certain component of the processing system 100 as representing a "higher-speed" or "lower-speed" component, this is for illustration only. Each component could operate at any suitable speed.

A graphics processor 125 processes graphics data for display to a user. The graphics processor 125 could, for example, include a bit block transfer (bitBLT) engine, a raster operations (ROP) unit, and an alpha compositing unit. The bitBLT engine transforms blocks of pixels, such as by changing colors or shades of pixels or rotating a block of pixels. The ROP unit performs various raster operations on the graphics data, such as 256 standard raster operations. The alpha compositing unit supports transparency of the graphics data. The graphics processor 125 could further support pattern generation, source expansion, pattern/source transparency, and ternary raster operations.

A display controller 130 generates displays for presentation to a user, including displays using the graphics produced by the graphics processor 125. The display controller 130 may retrieve graphics, video, and overlay streams from a frame buffer, serialize the streams, and perform any color look-ups and output formatting. The display controller 130 may also interface with a display filter for driving a display device. The display controller 130 may include a graphical user interface (GUI) and a video graphics array (VGA), which provides full hardware compatibility with the VGA graphics standard. For example, the VGA may pass eight-bit pixels and sync signals to the GUI, which may expand the pixels to 24-bit color values using a color lookup table.

A video processor 135 receives graphics data, video data, or other information to be displayed. The video processor 135 then outputs digital data capable of being displayed to a user. For example, the video processor 135 could mix graphics and video streams and output digital red, green, and blue (RGB) data. The video processor 135 could be capable of delivering high resolution and true color graphics. The video processor 135 may also overlay or blend a scaled true color video image on the graphics background.

The output of the video processor 135 may be supplied to a digital to analog converter (DAC) 140 or a Thin Film Transistor/Double-Layer Supertwist Nematic (TFT/DLSN) controller 145. The DAC 140 converts the digital values from the video processor 135 into analog values for display on a cathode ray tube (CRT). The DAC 140 may, for example, represent a 3×8 bit DAC. The TFT/DLSN controller 145 uses the digital values from the video processor 135 to generate a digital output signal suitable for display on a flat-panel liquid crystal display (LCD). In a particular embodiment, the TFT/DSTN controller 145 may drive all standard flat panel monitors up to 1024×768 resolution.

A PCI bridge 150 facilitates communication with an external PCI bus. For example, the PCI bridge 150 could support communication with a sound card, disk drive, or other device over the PCI bus. In one embodiment, the PCI bridge 150 includes read and write FIFO queues, an interface controller, and a PCI arbiter.

An input/output (I/O) companion interface 155 allows the processing system 100 to receive several signals that support functions such as resets, interrupts, and system power management.

A control processor 160 manages reset control, the macro clock, and debugging functions in the processing system 100. In one embodiment, the control processor 160 includes a JTAG interface and scan chain control logic. The control processor 160 also supports chip reset, which includes initial phase-locked loop (PLL) control and programming, and runtime power management macro-clock control. The JTAG support may include a TAP controller that is IEEE 1149.1 compliant. Control of the processing system 100 can be obtained through the JTAG interface into the TAP controller. Internal registers, including registers in the CPU core 110, may be accessed. In-circuit emulation (ICE) capabilities may be supported through the JTAG and TAP controller interface.

A memory controller 165 facilitates access to one or more external memories, such as one or more RAM modules or a mass storage device like a hard drive. For example, various components of the processing system 100, such as the CPU core 110, graphics processor 125, display controller 130, and TFT/DSTN controller 145, may need to store or retrieve data from the external memory, and the memory controller 165 facilitates access to the external memory. In one embodiment, the memory controller 165 can facilitate access to both single data rate (SDR) and dual data rate (DDR) memory. Also, the memory controller 165 can facilitate access to any amount of external memory, such as one gigabyte of memory. In a particular embodiment, the memory controller 165 allows data used by the CPU core 110 and graphics data to be stored in the external memory, thereby supporting a unified memory architecture (UMA).

A clock module 170 generates clock signals used by the various components of the CPU 100. For example, the clock module 170 could generate signals used by the CPU core 110 to execute integer and floating point instructions.

In one aspect of operation, data to be transferred between two clock domains is stored in a queue. As an example, one or more queues in the PCI bridge 150 could facilitate communication between the internal bus 120 of the processing system 100 and an external PCI bus operating at a different speed. In one embodiment, two flags are associated with each memory slot of the queue where data may be stored and retrieved. When data is written to or read from a memory slot in the queue, a first flag or a second flag, respectively, is toggled. One clock domain can determine whether a memory slot is free to store data and another clock domain can determine whether a memory slot contains valid data to be read by comparing the flags. In a particular embodiment, equal flags indicate that the memory slot can be used to store data, and unequal flags indicate that the memory slot contains data to be transferred across the boundary between the clock domains. In this way, simpler logic can be used to allow one clock domain to identify memory slots in which data will be stored and another clock domain to identify memory slots from which data will be read.

Although FIG. 1 illustrates one example of a Processing system 100, various changes may be made to FIG. 1. For example, the queue used to facilitate communication between clock domains can be implemented in any suitable processor and is not limited to the processing system 100 illustrated in FIG. 1. Also, the queue could be implemented in other or additional components in the processing system 100 and is not limited to being implemented in the PCI bridge 150. Further, the functional division of the components in FIG. 1 is for illustration only. Various components can be combined or omitted and additional components can be added according to particular needs. In addition, each component illustrated in FIG. 1 may be implemented in any hardware, software, firmware, or combination thereof.

Figure 2:
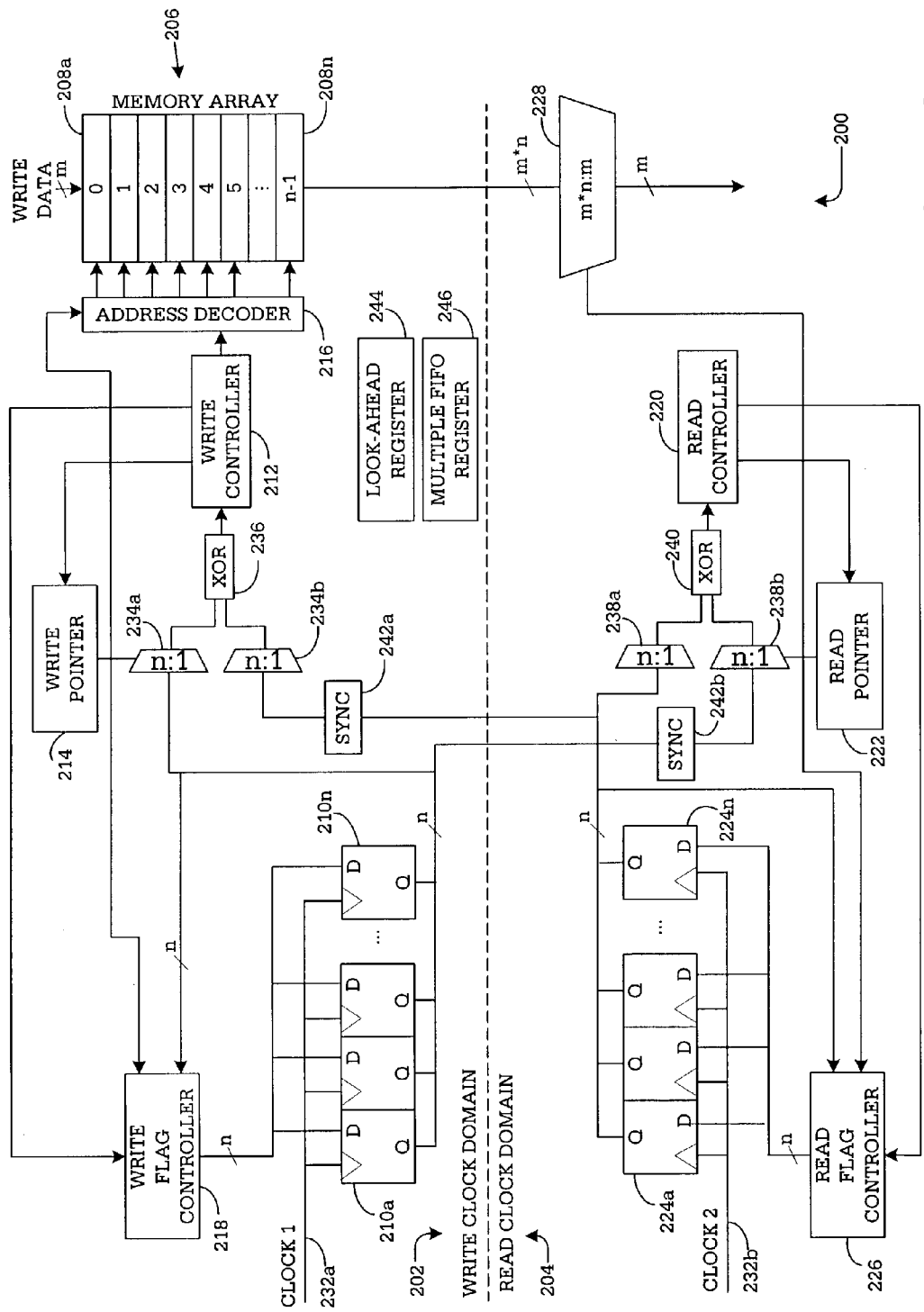
FIG. 2 is a block diagram of an example queue according to one embodiment of this disclosure.

FIG. 2 is a block diagram of an example queue 200 according to one embodiment of this disclosure. The queue 200 could, for example, form part of the PCI bridge 150 or other component in the processing system 100 of FIG. 1. The queue 200 illustrated in FIG. 2 is for illustration only. Other embodiments of the queue could be used without departing from the scope of this disclosure. Also, while the queue 200 may be described as being implemented in the processing system 100 of FIG. 1, the queue 200 could be implemented in any other suitable device or structure.

In the illustrated embodiment, the queue 200 includes a write clock domain portion 202 and a read clock domain portion 204. In this example, the queue 200 is used to transport information from one clock domain to another clock domain. The clock domain supplying the information may be referred to as a "write clock domain" because this clock domain is writing data into the queue 200. The clock domain retrieving the information may be referred to as a "read clock domain" because this clock domain is reading data from the queue 200. As a particular example, the queue 200 could be used to transfer information from the internal bus 120 of the processing system 100 to a PCI bus. In this example, the write domain portion 202 is used to store data from the internal bus 120, and the read portion 204 is used to supply data to the PCI bus. Another queue could be used to transport data from the PCI bus to the internal bus 120. Also, separate queues could be used to transport different types of information from the internal bus 120 to the PCI bus, such as one queue for data and another queue for instructions, commands, or other requests.

In this example embodiment, the write clock domain portion 202 includes a memory array 206. The memory array 206 stores data provided to the queue 200 by the write clock domain. The memory array 206 includes a plurality of slots 208a–208n, each slot 208 storing data from the write clock domain. Each slot 208 could store any suitable amount of information. The memory array 206 may include any hardware, software, firmware, or combination thereof that is operable to store and facilitate retrieval of information. For example, the memory array 206 could include one or more volatile or nonvolatile memory devices, one or more banks of flip-flops, or any other suitable device or structure.

The write clock domain portion 202 also includes a plurality of flip-flops 210a–210n. Each flip-flop 210 is associated with one of the slots 208 in the memory array 206. Each flip-flop 210 outputs a flag for the associated slot 208. In one embodiment, when data is written to a particular slot 208, the value output by the flip-flop 210 associated with that slot 208 is toggled. As a particular example, the flip-flop 210 may output either a value of one or a value of zero, and storing data in the associated slot 208 changes the value from a zero to a one or from a one to a zero.

A write controller 212 controls the storage of data in the memory array 206 and initiates the toggling of the values output by the flip-flops 210. For example, when data is received from the write clock domain, the write controller 212 determines the slot 208 in which the data should be stored. The write controller 212 also initiates the toggling of the flip-flop 210 associated with that slot 208. The write controller 212 may include any hardware, software, firmware, or combination thereof that is operable to control the storage of data in the memory array 206.

A write pointer 214 identifies the slot 208 in which the next piece of data received by the queue 200 should be stored. For example, the write pointer 214 could store a value between zero and n−1, where n represents the number of slots 208 in the memory array 206. When data is stored in a slot 208 identified by the write pointer 214, the value in the write pointer 214 is incremented. The write pointer 214 may include any hardware, software, firmware, or combination thereof that is operable to identify a slot 208 in the memory array 206. For example, the write pointer 214 could represent a counter that counts from zero to n−1 and then resets itself to zero.

An address decoder 216 supports the use of virtual addresses in the queue 200. For example, the write controller 212 and the write pointer 214 could identify slots 208 in the memory array 206 using integer values, such as integers from zero to 1. The address decoder 216 maps these values to the actual physical addresses of the slots 208 in the memory array 206. The address decoder 216 may include any hardware, software, firmware, or combination thereof that is operable to identify physical addresses of the slots 208.

A write flag controller 218 controls the operation of the flip-flops 210 and generates signals used to toggle the outputs of the flip-flops 210. For example, if a flip-flop 210 is outputting a value of zero, the write flag controller 218 can generate a signal causing the flip-flop 210 to toggle its output to a value of one. The write flag controller 218 may include any hardware, software, firmware, or combination thereof that is operable to control the operation of the flip-flops 210.

As shown in FIG. 2, the read clock domain portion 204 of the queue 200 includes a read controller 220. The read controller 220 controls the retrieval of data from the memory array 206. For example, the read controller 220 may cause data to be read from slots 208 in the memory array 206 and provided to a PCI bus or other device or structure. The read controller 220 may include any hardware, software, firmware, or combination thereof that is operable to control the retrieval of data from the memory array 206.

A read pointer 222 identifies the slot 208 in the memory array 206 from which data is to be retrieved next. The read pointer 222 may include any hardware, software, firmware, or combination thereof operable to identify a slot 208 in the memory array 206, such as a counter.

A plurality of flip-flops 224a–224n output additional flags for the slots 208 in the memory array 206. For example, each flip-flop 224 may be associated with one of the slots 208 in the memory array 206. When data is read from a particular slot 208 by the read domain portion 204 of the queue 200, the value output by the flip-flop 224 associated with that slot 208 is toggled.

A read flag controller 226 controls the operation of the flip-flops 224. For example, the read flag controller 226 may generate signals used to toggle the outputs of the flip-flops 224. The read flag controller 226 may include any hardware, software, firmware, or combination thereof that is operable to control the operation of the flip-flops 224.

A multiplexer 228 retrieves data from particular slots 208 of the memory array 206. For example, the multiplexer 228 may receive the number of a slot 208 from the read pointer 222. The multiplexer 228 then retrieves the data from that slot 208 of the memory array. The multiplexer 228 may include any hardware, software, firmware, or combination thereof that is operable to receive and select information.

In one aspect of operation, the write clock domain portion 202 and the read clock domain portion 204 use different clock signals 232a and 232b, respectively. These clock signals 232 control the operation of the flip-flops 210 and 224. These clock signals 232 may also control the writing of data to and the reading of data from the memory array 206. For example, data may be written to a memory slot 208 during each cycle of the clock signal 232a, and data may be read from a memory slot 208 during each cycle of the clock signal 232b. These clock signals 232 may or may be synchronized. If the clock signals 232 are not synchronized, the boundary between the write clock domain portion 202 and the read clock domain portion 204 represents an asynchronous boundary.

To support the transport of data across the boundary, the flip-flops 210 and 224 are used to identify when valid data has been placed in the memory array 206 and when the valid data has been retrieved from the memory array 206. In this embodiment, each slot 208 in the memory array 206 is associated with a pair of flip-flops, one flip-flop 210 and one flip-flop 224. In a particular embodiment, when both flip-flops 210, 224 in the pair are outputting the same value, this indicates that the slot 208 is empty or available for writing. If the flip-flops 210, 224 in the pair are outputting different values, this indicates that valid data has been stored in the slot 208 by the write clock domain portion 202 and has not been read by the read clock domain portion 204.

Upon initialization, each pair of flip-flops 210, 224 can be configured so that the flip-flops 210, 224 output the same value, indicating that a slot 208 contains no valid data. After that, the write controller 212 may detect that data needs to be stored in the memory array 206. The write pointer 214 supplies its current value to two multiplexers 234a and 234b. These multiplexers 234a and 234b identify the values output by the two flip-flops 210, 224 that are associated with the memory slot 208 pointed to by the write pointer 214. An XOR gate 236 performs a logical XOR operation on the values identified by the multiplexers 234.

If the values output by the two flip-flops 210, 224 are equal, this indicates that the slot 208 pointed to by the write pointer 214 is available for use. The XOR gate 236 generates a low output signal, and the write controller 212 initiates storage of the data in the selected slot 208. The write controller 212 also triggers the toggling of the flip-flop 210 associated with the slot 208. This changes the value output by the flip-flop 210 so it is different than the value output by the other flip-flop 224, indicating that valid data is now in the slot 208.

If the values output by the flip-flops 210, 224 are not the same, the XOR gate 236 generates a high output signal. This informs the write controller 212 that the selected slot 208 is not empty or available for writing. The write controller 212 may then take any suitable action. For example, the write controller 212 may cause the write pointer 214 to increment its value and see if the next slot 208 is empty or available for writing, or wait for the current slot 208 to become empty.

Similarly, the read controller 220 may detect when data can be transmitted to the PCI bus or other device or structure. The read pointer 222 supplies its current value to two multiplexers 238a and 238b. These multiplexers 238a and 238b identify the values output by the two flip-flops 210, 224 that are associated with the slot 208 pointed to by the read pointer 222. An XOR gate 240 performs a logical XOR operation on the values identified by the multiplexers 238.

If the values output by the flip-flops 210, 224 are identical, the XOR gate 240 generates a low output signal. This indicates that no valid data is present in the selected slot 208. The read controller 220 may then skip to the next slot 208 or perform any other action.

If the values output by the flip-flops 210, 224 are not the same, the XOR gate 236 generates a high output signal, which indicates that valid data is present in the memory slot 208. The read controller 220 then triggers retrieval of the data from the slot 208. The read controller 220 also triggers the toggling of the flip-flop 224 associated with the slot 208. This changes the value output by that flip-flop 224 so that the pair of flip-flops now output the same value, indicating that the slot 208 is again available for use.

Because the clock domains using the queue 200 may not be synchronized, each portion 202 and 204 of the queue 200 includes a synchronizer 242a and 242b, respectively. Each synchronizer 242 in one clock domain is used to read the outputs of the flip-flops in the other clock domain. For example, because the clock signals 232 may not be synchronized, the write clock domain portion 202 may attempt to read the output of a flip-flop 224 in the read domain clock portion 204 just as the output of that flip-flop 224 is changing. Each synchronizer 242 retrieves the value output by a flip-flop in the other clock domain and stabilizes the value. Each synchronizer 242 could include any hardware, software, firmware, or combination thereof operable to retrieve a value from an asynchronous clock domain. As an example, each synchronizer 242 could include one or more flip-flops.

As described above, the storage and retrieval of data in a slot 208 may be controlled using two flip-flops 210, 224. Storing data in a slot 208 toggles the output of one flip-flop 210, and retrieving that data from the slot 208 toggles the output of the other flip-flop 224. By simply comparing the values output by the flip-flops 210, 224, the write clock domain portion 202 can determine whether a slot 208 is available to store new data, and the read clock domain portion 204 can determine whether a slot 208 contains data to be retrieved. In this way, simpler logic can be used to control the operation of the queue 200.

One or more registers in the queue 200 may support additional functions. For example, a look-ahead register 244 can be used to determine whether a slot 208 in the memory array 206 is occupied. In this example, the look-ahead register 244 contains an offset for the value of the write pointer 214. The processing system 100 can add the value of the write pointer 214 and the offset in the look-ahead register 244 to identify a slot 208 in the memory array 206 that is "ahead of" the slot 208 currently identified by the write pointer 214. The processing system 100 can then determine whether the identified slot 208 is empty by comparing the values produced by the flip-flops 210, 224 associated with that slot 208. As a particular example, the write pointer 214 could identify the second memory slot 208. The processing system 100 could write a value of three to the look-ahead register 244. By adding the value of the write pointer 214 and the offset in the look-ahead register 244, the processing system 100 produces a value of five. The processing system 100 can then determine whether the fifth memory slot 208 is empty by comparing the value of the fifth flip-flop 210 and the value of the fifth flip-flop 224. The processing system 100 could then change the value in the look-ahead register 244 to a value of four. The processing system 100 may then repeat this process for the sixth memory slot 208. In this way, the processing system 100 can easily determine whether one or more memory slots 208 are empty by simply storing different values in the look-ahead register 244.

Although this has described the look-ahead register 244 as containing a value that is added to the write pointer 214, the look-ahead register 244 could also contain an independent value that identifies a slot 208 without requiring an addition operation. Also, although FIG. 2 illustrates a single look-ahead register 244 in the write domain 202, another look-ahead register 244 could be provided in the read domain 204.

A multiple FIFO register 246 can also be used in the queue 200. In one embodiment, the memory array 206 can be used to support a single first in-first out queue. In another embodiment, the memory array 206 can be used to support multiple first in-first out queues. As a particular example, one-third of the memory slots 208 could be used as a first queue, and two-thirds could be used as a second queue. In this embodiment, the multiple FIFO register 246 identifies a memory slot 208 representing a boundary between the two queues. As an example, the multiple FIFO register 246 could identify the last memory slot 208 used in the first queue or the first memory slot 208 used in the second queue. The processing system 100 could also store different values in the register 246 at different times, allowing the processing system 100 to alter the sizes of the queues as needed. Although FIG. 2 illustrates one multiple FIFO register 246 in the write domain 202, another multiple FIFO register 246 could be used in the read domain 204 or the single multiple FIFO register 246 could accessed by the read domain 204.

Although FIG. 2 illustrates one example of a queue 200, various changes may be made to FIG. 2. For example, while flip-flops 210, 224 are illustrated as generating the flags, any other suitable structure or structures could be used to generate or store the flags. Also, any suitable number of slots 208 may be used in the memory array 206. In addition, any suitable number of look-ahead registers 244 could be used in each of the write domain 202 and the read domain 204. In this example, each look-ahead register 244 could be associated with an XOR gate 236,240 and multiplexers 234, 238.

Figure 3:
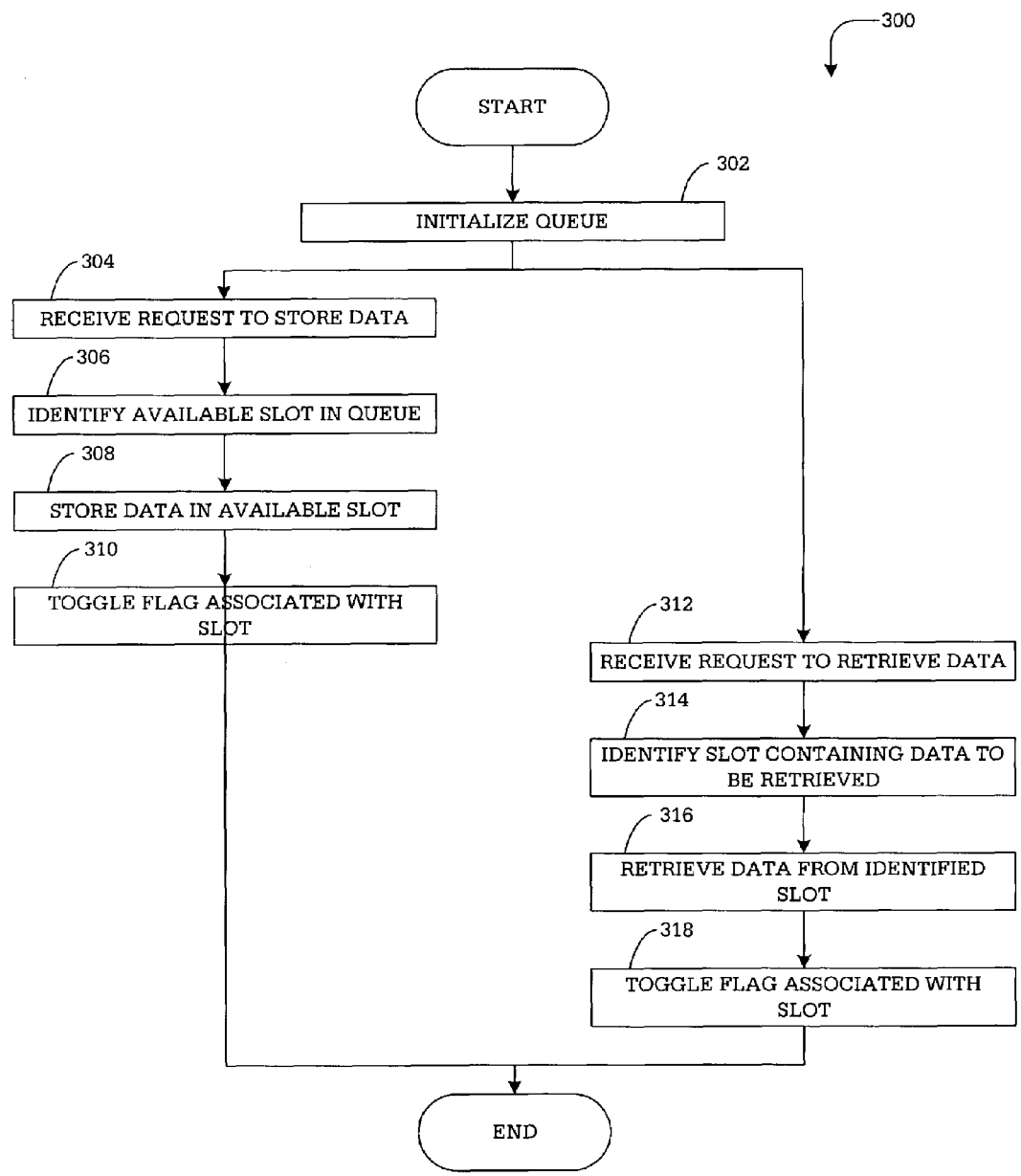
FIG. 3 is a flow diagram of an example method for facilitating communication across an asynchronous clock boundary according to one embodiment of this disclosure.

FIG. 3 is a flow diagram of an example method 300 for facilitating communication across an asynchronous clock boundary according to one embodiment of this disclosure. While FIG. 3 may be described with respect to the processing system 100 of FIG. 1 using the queue 200 of FIG. 2, the method 300 could be executed by any suitable processing system using any suitable queue.

The processing system 100 initializes the queue 200 at step 302. This may include, for example, the write controller 212 and the read controller 220 ensuring that the flip-flops 210, 224 are outputting the same value.

The processing system 100 receives a request to store data in a queue at step 304. This may include, for example, the write controller 212 detecting data to be stored in the memory array 206 of the queue 200. The processing system 100 identifies a location in the queue where the data may be stored at step 306. This may include, for example, the write pointer 214 providing its current value, which identifies a memory slot 208, to the multiplexers 234. This may also include the multiplexers 234 identifying the values output by the flip-flops 210, 224 associated with the slot 208. This may further include the XOR gate 236 performing a logical XOR operation to compare the identified values. If the values are the same, the write controller 212 can use the slot 208 identified by the write pointer 214. Otherwise, the write controller 212 may take any suitable action, such as waiting for the identified slot 208 to become empty or causing the write pointer 214 to increment its value and repeating the process using another slot 208.

The processing system 100 stores the data in the selected memory location at step 308. This may include, for example, the address decoder 216 using the value from the write pointer 214 to identify the physical address of the selected slot 208 in the memory array 206. This may also include storing the data at that physical address.

The processing system 100 toggles the flag associated with the memory location used to store the data at step 310. This may include, for example, the write controller 212 instructing the write flag controller 218 to toggle the flag associated with the memory slot 208. This may also include the write flag controller 218 causing the flip-flop 210 associated with the slot 208 to toggle its output. At this point, the flip-flop 210 associated with the slot 208 has a different value from the flip-flop 224 associated with the slot 208, indicating that the slot 208 contains valid data to be read.

In series with or in parallel with these steps, the processing system 100 also receives a request to read data from the queue at step 312. This may include, for example, the read controller 220 detecting that a device wishes to retrieve data from the queue 200. The processing system 100 identifies a location in the queue where the data may be retrieved at step 314. This may include, for example, the read pointer 222 providing its current value, which identifies a slot 208, to the multiplexers 238. This may also include the multiplexers 238 identifying the values output by the flip-flops 210, 224 associated with the slot 208. This may further include the XOR gate 240 performing a logical XOR operation to compare the identified values. If the values are different, the read controller 220 determines that valid data can be read from the slot 208 identified by the read pointer 222. Otherwise, the read controller 220 can take any suitable action, such as by waiting for the slot 208 to become full or by repeating this process by incrementing the read pointer 222 and using another slot 208.

The processing system 100 retrieves the data from the identified memory location at step 316. This may include, for example, the read pointer 222 identifying the slot 208 and the multiplexer 228 retrieving the data in that slot 208.

The processing system 100 toggles the flag associated with the memory location from which the data was retrieved at step 318. This may include, for example, the read controller 220 instructing the read flag controller 226 to toggle the flag associated with the memory slot 208. This may also include the read flag controller 226 causing the flip-flop 224 associated with the slot 208 to toggle its output. At this point, the flip-flop 224 associated with the slot 208 outputs the same value as the flip-flop 210 associated with the slot 208, indicating that the slot 208 is now available for use again.

Although FIG. 3 illustrates one example of a method 300 for facilitating communication across an asynchronous clock boundary, various changes may be made to FIG. 3. For example, the flip-flops 210, 224 can be initialized to output either ones or zeros during step 302. Also, the method 300 has been described as using equal flags to represent an available slot 208 and unequal flags to represent a slot 208 with valid data. In another embodiment, equal flags could represent a slot 208 with valid data and unequal flags could represent an available slot 208.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system, comprising:
   a memory comprising a plurality of memory slots;
   a first set of latches to store first flags associated with the plurality of memory slots;
   a second set of latches to store second flags associated with the plurality of memory slots;
   at least one controller operable to at least one of store data in the memory slots and retrieve data from the memory slots based at least partially on the first and second flags associated with the memory slots;
   a pair of multiplexers operable to select one of the first flags from the first set of latches and to select one of the second flags from the second set of latches; and
   an XOR gate operable to perform a logical XOR operation on the selected first flag from the first set of latches and the selected second flag from the second set of latches.

2. The system of claim 1, wherein the XOR gate generates one of:
   a first signal identifying whether the memory slot associated with the selected flags is available for storing data, the memory slot being available when the selected flags have equal values; and
   a second signal identifying whether the memory slot associated with the selected flags contains data to be read, the memory slot containing data to be read when the selected flags have unequal values.

3. The system of claim 1, further comprising a synchronizer coupled to one of the multiplexers, the synchronizer operable to retrieve the flags from one of the sets of latches when the first and second sets of latches use asynchronous clock signals.

4. The system of claim 1, further comprising a pointer identifying one of the memory slots, wherein the at least one controller is operable to at least one of store data in the memory slot identified by the pointer and retrieve data from the memory slot identified by the pointer.

5. The system of claim 1, wherein the at least one controller comprises:
   a write controller operable to store data in the memory slots; and
   a read controller operable to retrieve data from the memory slots.

6. A processor, comprising:
   an integer unit operable to execute integer instructions;
   a floating point unit operable to execute floating point instructions;
   a memory comprising a plurality of memory slots;
   a first set of latches to store first flags associated with the memory slots; and
   a second set of latches store second flaps associated with the memory slots;
   at least one controller operable to at least one of:
      store data in one of the memory slots and toggle a first flag associated with that memory slot; and
      retrieve data from one of the memory slots and toggle a second flag associated with that memory slot;
   a pair of multiplexers operable to select one of the first flags from the first set of latches and to select one of the second flags from the second set of latches; and
   an XOR gate operable to perform a logical XOR operation on the selected first flag from the first set of latches and the selected second flag from the second set of latches, the XOR gate operable to generate one of:
      a first signal identifying whether the memory slot associated with the selected flags is available for storing data, the memory slot being available when the selected flags have equal values; and
      a second signal identifying whether the memory slot associated with the selected flags contains data to be read the memory slot containing data to be read when the selected flags have unequal values.

7. The processor of claim 6, wherein:
   data stored in the memory slots comes from a first clock domain; and
   the data is retrieved from the memory slots for a second clock domain.

8. The processor of claim 7, wherein:
   the data stored in the memory slots is received over an internal bus of the processor; and
   the data retrieved from the memory slots is transported over a peripheral component interconnect bus.

9. The processor of claim 6, further comprising a synchronizer coupled to one of the multiplexers, the synchronizer operable to retrieve the flags from one of the sets of latches when the first and second sets of latches use asynchronous clock signals and to provide the flags to one of the multiplexers.

10. A method for accessing a queue having a plurality of memory slots, each memory slot associated with one of a first set of latches corresponding to a first flag and a one of a second set of latches corresponding to a second flag, the method comprising:
    selecting one of the first flags of the first set of latches using a first multiplexer;
    selecting one of the second flags of the second set of latches using a second multiplexer;
    performing a first logical XOR operation on the selected first flag and the selected second flag to generate one of a first signal or a second signal, the first signal indicating whether the memory slot associated with the selected first and second flags is available for storing data and the second signal indicating whether the memory slot associated with the selected first and second flags contains data to be read;
    storing data in the memory slot associated with the selected first and second flags based on the first signal; and
    reading data from the memory slot associated with the selected first and second flags based on the second signal.

11. The method of claim 10, wherein data is stored in the memory slot when the first signal indicates that the selected first and second flags have equal values.

12. The method of claim 10, wherein data is read from the memory slot when the second signal indicates that the selected first and second flags have unequal values.

13. The method of claim 10, further comprising toggling the latch of the first set of latches associated with the selected first flag in response to storing data in the memory slot associated with the selected first and second flags.

14. The method of claim 10, further comprising toggling the latch of the second set of latches associated with the selected second flag in response to reading data from the memory slot associated with the selected first and second flags.

* * * * *

UNITED STATES PATENT AND TRADEMARK OFFICE
CERTIFICATE OF CORRECTION

PATENT NO. : 7,035,983 B1 Page 1 of 1
APPLICATION NO. : 10/423993
DATED : April 25, 2006
INVENTOR(S) : David J. Fensore It is certified that error appears in the above-identified patent and that said Letters Patent is hereby corrected as shown below:

Column No. 14, Line No. 7 change "read" to --read,--

Signed and Sealed this

First Day of August, 2006

JON W. DUDAS
*Director of the United States Patent and Trademark Office*